Feb. 2, 1937. A. SCHNORF 2,069,562
APPARATUS FOR THE ANALYSIS OF A CHEMICALLY PURIFIED WATER
Filed Oct. 6, 1934
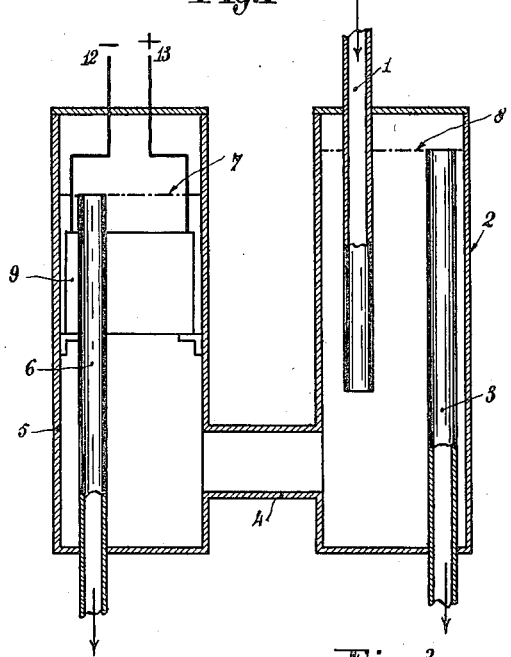
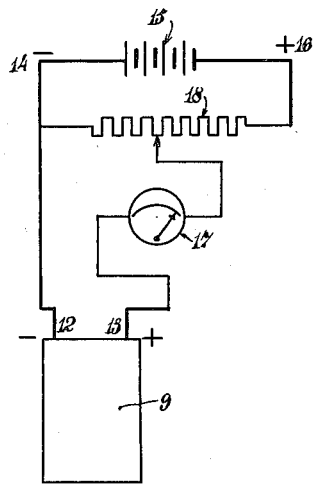
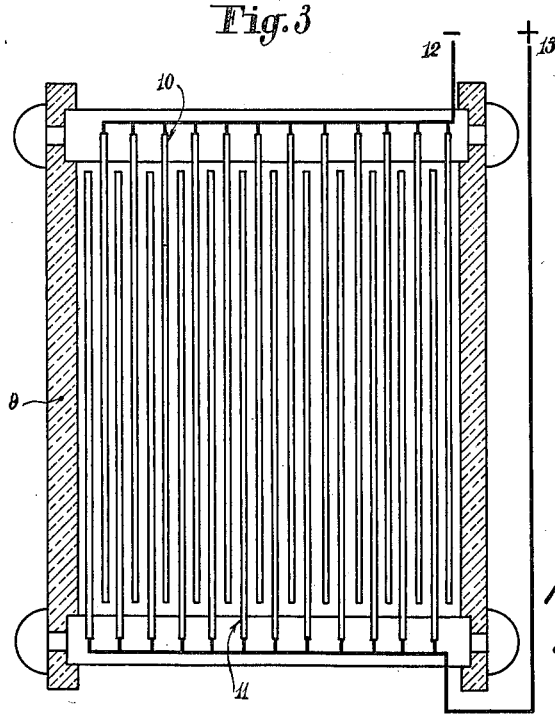
INVENTOR
ARMAND SCHNORF Patented Feb. 2, 1937

2,069,562

UNITED STATES PATENT OFFICE 2,069,562

APPARATUS FOR THE ANALYSIS OF A CHEMICALLY PURIFIED WATER

Armand Schnorf, Saint-Aubin, Neuchatel, Switzerland

Application October 6, 1934, Serial No. 747,237
In Switzerland May 16, 1934

1 Claim. (Cl. 23—253)

The present invention relates to an apparatus which renders it possible to determine the quantity of oxidizing agent in excess in a chemically purified water.

The processes for sterilization of drinking-waters are based upon the addition of strong oxidizing agents to the preliminarily filtered water. Ozone, hypochlorite and chlorine are the oxidizing agents most commonly used.

It is necessary to determine, by means of a preliminary chemical analysis, the quantity of oxidizing agent which should be added in order to obtain perfect sterilization.

But the content in organic matter of waters varies considerably according to the seasons and even according to the hour of the day. In order to be certain that at any instant the water is sterilized, it is therefore necessary to add an excess of oxidizing agent. This excess presents drawbacks; it increases the cost price of the sterilization operation; it can impart to the water deleterious properties; finally, when Javel water is used, this oxidizing agent imparts a disagreeable taste to the water. By the treatment of the javelized water with absorbent charcoal, the excess of hypochlorite which these waters contain is retained and the latter are deodorized, but, from the point of view of economy, it is always advantageous to add to the water the minimum quantity of oxidizing agent sufficient for ensuring perfect purification. The only way of estimating this minimum quantity is by continual analysis of the water, which is practically impossible.

The present invention consists in utilizing—in order to determine the quantity of oxidizing agent in excess in the purified water—the variation caused by the presence of this oxidizing agent on the value of the electromotive force of a couple immersed in the water and consisting of positive electrodes of a metal susceptible to be attacked by an electrolyte (a metal such as zinc for instance) and of negative electrodes of a polished metal capable of causing over-pressure of hydrogen (copper, for instance).

The value of the electromotive force of the aforesaid couple may be determined by the ordinary method called "by opposition".

Another process for measuring the electromotive force of this couple consists in determining the value of the intensity of a current which passes through an ordinary ammeter or a recording ammeter inserted in a circuit consisting of a source of current, the electromotive force of which is strictly constant and is in opposition to that of the couple. The connection of the electric circuit is effected in such a manner that, when the aforesaid couple is immersed in the water not containing any excess of oxidizing agent, no current passes through the ammeter; when this couple is immersed in water containing an excess of oxidizing agent, it is established that the value of the current passing through the ammeter is then directly proportional to the quantity of oxidizing agent.

In these opposition methods, the couple formed delivers current; it then consumes all or a part of the oxidizing agent contained in the water. It will be understood that under these conditions the intensity of this current varies not only with the concentration of the oxidizing agent in the water, but also with the supply of the column of purified water circulating between the electrodes.

The determination of the excess of oxidizing agent present in a previously purified water is therefore strictly correct only if the supply of purified water is maintained constant in the measuring apparatus.

When the measurement is effected by means of an ammeter, or more precisely of a milliammeter, the resistance of this measuring apparatus should be made considerable in relation to the total resistance of the column of purified water circulating between the electrodes of the apparatus in order to eliminate the influence of possible variations in conductivity of the water. It is this consideration that has led to the utilization of a large number of electrodes coupled electrically in parallel and very close together, which considerably diminishes the total resistance of the column of water between the electrodes.

The apparatus forming the subject of the present invention thus comprises a device intended to ensure that the supply of purified water between the electrodes shall be kept constant.

An embodiment of this apparatus is shown by way of example, in the appended drawing, wherein:

Fig. 1 is a diagrammatic view of the said apparatus.

Fig. 2 is a diagrammatic view of the electric connections of the measuring apparatus.

Fig. 3 represents in section a diagrammatic view of the detector combined with the measuring apparatus.

As shown in the drawing, the chemically purified water penetrates, by way of the pipe 1, into the regulating tank 2 provided with an overflow pipe 3. Near its bottom, the tank 2 communicates at 4 with a second parallel tank 5 also provided with an overflow pipe 6 which, however, is located at a level 7 which is lower than the level 8 of the overflow pipe 3, so that the water to be analyzed flows in regularly and maintains a constant supply to the interior of the tank 5.

In this pipe 1, the supply of the water is regulated in such a manner as to produce a permanent outflow by the overflow pipes 3 and 6.

Immersed in the interior of the tank 5 is a detector 9 comprising a series of electrodes 10 of a metal capable to be attacked by an electrolyte (a metal such as zinc or cadmium) and a series of electrodes 11 of a polished metal capable of causing overpressure of the hydrogen (a metal such as copper or tin); these electrodes are very close together and each of the series is coupled electrically in parallel in such a manner as to terminate in two terminals 12 and 13 respectively.

In order to determine the quantity of oxidizing agent in excess in the purified water arriving by the pipe 1, the negative terminal 12 may be connected with the terminal 14, likewise negative, of a source of current 15, the positive terminal 16 of which being connected to the positive terminal 13; the source of current 15 has an electromotive force that is strictly constant and which is in opposition to that of the couple immersed in the purified water. As shown in Fig. 2, a simple milliammeter or a recording milliammeter 17 and a resistance 18 which may be rendered variable, are inserted in the circuit of the source of current 15. In order to eliminate the influence of the possible variations in conductivity of the water, the resistance of the circuit containing the milliammeter should be made considerable in relation to the total resistance of the column of water circulating between the electrodes 10 and 11.

The connection of the aforesaid electric circuit is effected in such a manner that, when the aforesaid couple is immersed in water not containing any excess of oxidizing agent, no current passes through the milliammeter 17, and, when this couple is immersed in water containing an excess of oxidizing agent, the value of the intensity of the current is directly proportional to the quantity of oxidizing agent in excess in the water.

The connection described renders it possible to eliminate the possible influence of electromotive forces of filtration; it also permits the elimination of variations in the value of the pH of the water.

In order to measure the electromotive force of the couple by the so-called "opposition" method, the milliammeter is replaced by a voltmeter. The connection is then regulated in accordance with the following conditions: When the couple is immersed in the water which does not contain any excess of oxidizing agent, the electromotive forces of the couple and of the source of current are the same, and thus the voltmeter gives no indication; then, when the couple is immersed in water which contains an excess of oxidizing agent, the voltmeter supplies indications which are functions of the electromotive force of the couple immersed in the purified water and, consequently, of the quantity of oxidizing agent in excess in the water.

If the concentration of oxidizing agent in the water is constant, it is possible to use the apparatus for measuring the speed of circulation of the water because the potential between the electrodes is then a simple function of the supply of water between these electrodes. This consideration may be contemplated in connection with river water containing air dissolved to the point of saturation and the speed of circulation of which may be thus measured.

What I claim is:

Apparatus for determining the quantity of oxidizing agent in excess in a chemically purified water according to the variations of the value of the electromotive force of an electrical couple immersed in the water to be analyzed, comprising a receptacle within which is maintained a strictly constant supply of the chemically purified water, a detector immersed in the water, the said detector comprising a series of positive electrodes and a series of negative electrodes, the electrodes of each series being electrically coupled in parallel and the electrodes of the respecive series being disposed very close together, the positive electrodes being of a metal capable of being attacked by an electrolyte and the negative electrodes being of a polished metal capable of causing overpressure of the hydrogen, a source of current, the said positive and negative electrodes being respectively connected to the positive and negative terminals of a circuit including said source of current, said source of current having a strictly constant electromotive force which is in opposition to that of the couple immersed in the water, an electrical apparatus for measuring the electromotive force of the said couple, and a variable resistance in the circuit of said apparatus which resistance is considerable in relation to the total resistnce of the column of purified water flowing between the electrodes of the detector.

ARMAND SCHNORF.